US012097856B2

United States Patent
Austin et al.

(10) Patent No.: US 12,097,856 B2
(45) Date of Patent: *Sep. 24, 2024

(54) SYSTEM AND METHOD FOR ADJUSTING A YIELDING SPACE OF A PLATOON

(71) Applicant: TOYOTA JIDOSHA KABUSHIKI KAISHA, Toyota (JP)

(72) Inventors: Benjamin P. Austin, Saline, MI (US); Joshua E. Domeyer, Madison, WI (US); John K. Lenneman, Okemos, MI (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/856,284

(22) Filed: Jul. 1, 2022

(65) Prior Publication Data

US 2022/0332321 A1 Oct. 20, 2022

Related U.S. Application Data

(63) Continuation of application No. 17/009,238, filed on Sep. 1, 2020, now Pat. No. 11,407,415.

(51) Int. Cl.
*B60W 30/00* (2006.01)
*B60W 30/16* (2020.01)
(Continued)

(52) U.S. Cl.
CPC ........ *B60W 30/165* (2013.01); *B60W 30/162* (2013.01); *B60W 40/04* (2013.01);
(Continued)

(58) Field of Classification Search
CPC ........... B60W 30/165; B60W 60/0017; B60W 60/00274; B60W 30/162; B60W 40/04;
(Continued)

(56) References Cited

U.S. PATENT DOCUMENTS 9,669,872 B2 6/2017 Rebhan et al.
9,836,056 B2 * 12/2017 Ansari ................ G05D 1/0212
(Continued)

FOREIGN PATENT DOCUMENTS

JP 2014-41434 A 3/2014

OTHER PUBLICATIONS

M. Liu, "Fusing Radar and Vision Data for Cut-In Vehicle Identification in Platooning Applications" Apr. 2020 (Year: 2020).*
(Continued)

*Primary Examiner* — Russell Frejd
*Assistant Examiner* — Brittany Renee Peko
(74) *Attorney, Agent, or Firm* — Oblon, McClelland, Maier & Neustadt, L.L.P.

(57) ABSTRACT

A system and a method for adjusting a yielding space of a platoon are provided. The system can include camera modules, sensors, interface circuitry, processing circuitry, and memory. The sensors can detect one or more behaviors of one or more vehicles adjacent to the platoon. The processing circuitry can determine one or more triggering events between the one or more vehicles and the platoon based on the one or more behaviors. The processing circuitry can adjust the yielding space of the platoon.

16 Claims, 5 Drawing Sheets

(51) Int. Cl.
   *B60W 30/165* (2020.01)
   *B60W 40/04* (2006.01)
   *B60W 60/00* (2020.01)
   *G05D 1/00* (2006.01)
   *G06V 20/58* (2022.01)
   *G08G 1/00* (2006.01)

(52) U.S. Cl.
   CPC .. *B60W 60/0017* (2020.02); *B60W 60/00274* (2020.02); *G05D 1/0289* (2013.01); *G05D 1/0293* (2013.01); *G06V 20/58* (2022.01); *G06V 20/584* (2022.01); *G08G 1/22* (2013.01); *B60W 2420/403* (2013.01); *B60W 2420/408* (2024.01); *B60W 2554/4045* (2020.02); *B60W 2556/10* (2020.02); *B60W 2556/50* (2020.02)

(58) Field of Classification Search
   CPC ......... B60W 2556/10; B60W 2556/50; B60W 2554/4045; B60W 2420/42; B60W 2420/52; G05D 1/0289; G05D 1/0293; G06K 9/00805; G06K 9/00825; G08G 1/22
   See application file for complete search history.

(56) References Cited

U.S. PATENT DOCUMENTS

| | | | |
|---|---|---|---|
| 10,065,643 | B2 | 9/2018 | Ito et al. |
| 10,089,876 | B1* | 10/2018 | Ramasamy ............ G08G 1/162 |
| 10,234,871 | B2 | 3/2019 | Klaus et al. |
| 10,252,721 | B1* | 4/2019 | Bai ................. B60W 30/18163 |
| 2015/0266477 | A1* | 9/2015 | Schmudderich ...... B60W 30/14 |
| 2016/0019782 | A1* | 1/2016 | Alam ....................... G08G 1/01 |
| 2017/0124407 | A1* | 5/2017 | Micks ............... G06K 9/00845 |
| 2019/0061758 | A1 | 2/2019 | Ide |
| 2019/0086916 | A1 | 3/2019 | Choi |
| 2019/0164420 | A1 | 5/2019 | Wendt et al. |
| 2019/0265703 | A1 | 8/2019 | Hicok et al. |
| 2019/0315271 | A1 | 10/2019 | Tatara et al. |
| 2019/0367021 | A1 | 12/2019 | Zhao et al. |
| 2021/0294352 | A1 | 3/2021 | Kessler |
| 2021/0172749 | A1 | 6/2021 | Shin |
| 2021/0319701 | A1 | 10/2021 | Mishima |
| 2021/0335134 | A1 | 10/2021 | Park |
| 2021/0358308 | A1 | 11/2021 | Li |
| 2021/0370937 | A1 | 12/2021 | Park |

OTHER PUBLICATIONS

G. Markkula, "A Steering Wheel Reversal Rate Metric for Assessing Effects of Visual and Cognitive Secondary Task Load" Oct. 2006 (Year: 2006).*

* cited by examiner

SYSTEM AND METHOD FOR ADJUSTING A YIELDING SPACE OF A PLATOON

CROSS-REFERENCE TO RELATED APPLICATIONS

This application is a continuation of U.S. application Ser. No. 17/009,238, filed on Sep. 1, 2020; the entire contents of which are incorporated herein by reference.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

U.S. 20190367021 to Zhao et al. describes predicting behaviors of oncoming vehicles. In particular, the invention includes identifying an oncoming vehicle based on first observation data received from sensors of the autonomous vehicle and identifying a road object based on second observation data received from the sensors of the autonomous vehicle.

SUMMARY

According to an embodiment of the present disclosure, a system and a method for adjusting a yielding space of a platoon are provided. The system can include camera modules, sensors, interface circuitry, processing circuitry, and memory. A first set of sensors can detect one or more behaviors of one or more vehicles adjacent to the platoon and the first set of sensors can be in the platoon. The processing circuitry can determine one or more triggering events between the one or more vehicles and the platoon based on the one or more behaviors. The processing circuitry can adjust a yielding space of the platoon.

In an example, a second set of sensors can detect the one or more behaviors of the one or more vehicles adjacent to the platoon and the second set of sensors can be in the one or more vehicles adjacent to the platoon.

In an example, the processing circuitry can analyze driving history of the one or more vehicles adjacent to the platoon. The processing circuitry can adjust the yielding space of the platoon based on the driving history of the one or more vehicles adjacent to the platoon.

In an example, the first set of sensors includes one or more camera modules, Lidar, radars, or ultrasonic sensors.

In an example, the one or more behaviors of the one or more vehicles include changes in vehicle speed, changes in lane position, driver head orientation, driver head movement, and location of hands of the drivers on a steering wheel of the one or more vehicles.

In an example, the one or more triggering events include the one or more vehicles entering into the platoon and the one or more vehicles crossing the platoon.

In an example, the yielding space is adjusted based on the one or more triggering events, the adjustment including a speed of adjusting the yielding space and a length of the yielding space.

In an example, the driving history includes brake usage, vehicle speed, turning signal usage, steering entropy, steering wheel reversal frequency, steering wheel reversal rate, and average vehicle position within lane.

According to an embodiment of the present disclosure, there is provided a non-transitory computer readable storage medium having instructions stored thereon that when executed by processing circuitry causes the processing circuitry to perform the method.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

A system can include camera modules, sensors, interface circuitry, processing circuitry, and memory. A first set of sensors can collect data such as one or more behaviors of other vehicles adjacent to the first vehicle. The first set of sensors can be located in vehicles of the platoon. The processing circuitry can determine one or more triggering events between the one or more vehicles and the platoon based on the one or more behaviors. For example, the one or more behaviors of the one or more vehicles can include changes in vehicle speed, changes in lane position, driver head orientation, driver head movement, and location of hands of the drivers on a steering wheel of the one or more vehicles. If a vehicle changes speed when the vehicle is approaching a platoon, a triggering event will be determined by the processing circuitry. The triggering event may be that the vehicle plans to cross the platoon or the vehicle plans to enter into the platoon.

In an embodiment, the processing circuitry can adjust a yielding space of the platoon based on the event determined by the processing circuitry. For example, if the processing circuitry determines that the vehicle plans to cross the platoon, then the platoon may increase the yielding space for the vehicle to cross the platoon. In another example, if the processing circuitry determines that the vehicle plans to enter into the platoon, then the platoon may also increase the yielding space for the vehicle to enter into the platoon.

In some embodiments, the processing circuitry may use a driving history of the vehicle adjacent to the platoon to determine the yielding space for the vehicle. For example, if the driving history of the vehicle adjacent to the platoon shows that the vehicle swerves from side to side frequently, the processing circuitry may determine that this is merely a driving habit for the driver of the vehicle. The processing circuitry may not adjust the yielding space of the platoon since the driver may not have intent to enter the platoon. In some embodiments, the driving history may include brake usage, vehicle speed, and turning signal usage.

In an example, a second set of sensors can detect the one or more behaviors of the one or more vehicles adjacent to the platoon and the second set of sensors can be in the one or more vehicles adjacent to the platoon. For example, the second set of sensors detect changes in vehicle speed, changes in lane position, driver head orientation, driver head movement, and location of hands of the drivers on a steering wheel of the one or more vehicles. The second set of sensors is in the one or more vehicles.

The processing circuitry can access behavior data detected by the second set of sensors. For example, the processing circuitry can access behavior data such as driver's head movement record of the one or more vehicles or the driver's head orientation record during a period of time.

The processing circuitry can determine one or more triggering events between the one or more vehicles and the platoon based on the one or more behaviors. For example, if the one or more vehicles slow down while the one or more vehicles drive towards the platoon, a first triggering event may be detected. The first triggering event may indicate that the one or more vehicles plan to cross the platoon or enter into the platoon.

In some embodiments, if the one or more vehicles make a maneuver in a direction of a platoon, a second triggering event may be detected. The second triggering event may indicate that the one or more vehicles plan to cross or enter into the platoon since the one or more vehicles currently drive towards the direction of the platoon.

In some embodiments, when drivers of the one or more vehicles change their head orientation towards the platoon, a third triggering event may be detected. The third triggering event may indicate that the drivers also plan to cross the platoon or enter into the platoon by turning their heads to the platoon.

In some embodiments, if hands of the drivers on the steering wheel are facing a direction of the platoon, a fourth triggering event may be detected. The fourth triggering event may indicate that the drivers plan to drive towards the platoon and the drivers have an intention of crossing or entering into the platoon.

The processing circuitry can adjust the yielding space of the platoon based on the triggering events described above. For example, when the drivers plan to enter or cross into the platoon, the processing circuitry may adjust the yielding space of the platoon to be larger for the one or more vehicles to enter into or cross the platoon.

In some embodiments, if any of the behaviors intensify, the yielding space of the platoon may be adjusted according to the intensifying behaviors. The adjustment may include a speed of adjusting the yielding space or a length of the yielding space. For example, if the head movement of a first driver turns to the platoon more frequently than the head movement of a second driver, then the yielding space of the platoon may be adjusted to be wider for the vehicle of the first driver than the vehicle of the second driver. Furthermore, the processing circuitry may also be able to more quickly adjust the yielding space for the vehicle of the first driver than the vehicle of the second driver.

In another example, if the first driver turns their head to the direction of the platoon and stays on this direction, then the yielding space of the platoon may be adjusted to be wider since the processing circuitry may determine that the driver has an intention to drive towards the platoon. In addition, the processing circuitry may also be able to more quickly adjust the yielding space for the vehicle of the first driver than the vehicle of the second driver.

In some embodiments, the first set of sensors and the second set of sensors may collect one or more pieces of information such as a vehicle speed, a wheel speed, a yaw angle, a tilt angle, a compass heading, an elevation, an altitude, a LIDAR data, a sonar data, or GPS coordinates information.

In some embodiments, the first set of sensors in the platoon and the second set of sensors in the one or more vehicles may collect external data, and the external data including at least one of: temperature, humidity, or air quality. The first set of sensors in the platoon and the second set of sensors in the one or more vehicles may also collect road information for the platoon to use. Further, the road information can be associated with events, such as an accident, a criminal event, a school event, a construction, a celebration, a sport event, and/or the like. The platoon may adjust the yielding space according to the road information. For example, if there is a school event nearby the vehicles that are adjacent to the platoon, the school event may affect the speed and driving direction of the vehicles adjacent to the platoon. If the vehicles slow down and the driving direction of the vehicles is facing the platoon, the platoon can adjust the yielding space for the vehicles.

In some embodiments, passengers of the vehicles may also have sensors. The sensors of the passengers may be cell phones or camera modules. The sensors of the passengers may try to detect the one or more behaviors of the vehicles adjacent to the platoon. Therefore, the sensitivity to detect the one or more behaviors of the vehicles adjacent to the platoon may be improved by including the data collected from the sensors of the passengers.

In an example, the processing circuitry can further share the detected one or more behaviors to a threshold amount of users, the threshold being defined by a driver of the platoon. For example, the detected one or more behaviors are detected by a first vehicle in the platoon and the processing circuitry of first vehicle determines that the vehicles adjacent to the platoon are driving towards the platoon. After determining that the vehicles adjacent to the platoon are driving towards the platoon, the processing circuitry of the first vehicle may share the detected one or more behaviors with other vehicles in the platoon. The number of the other drivers in the other vehicles may be determined by the processing circuitry of the first vehicle.

Figure 1:
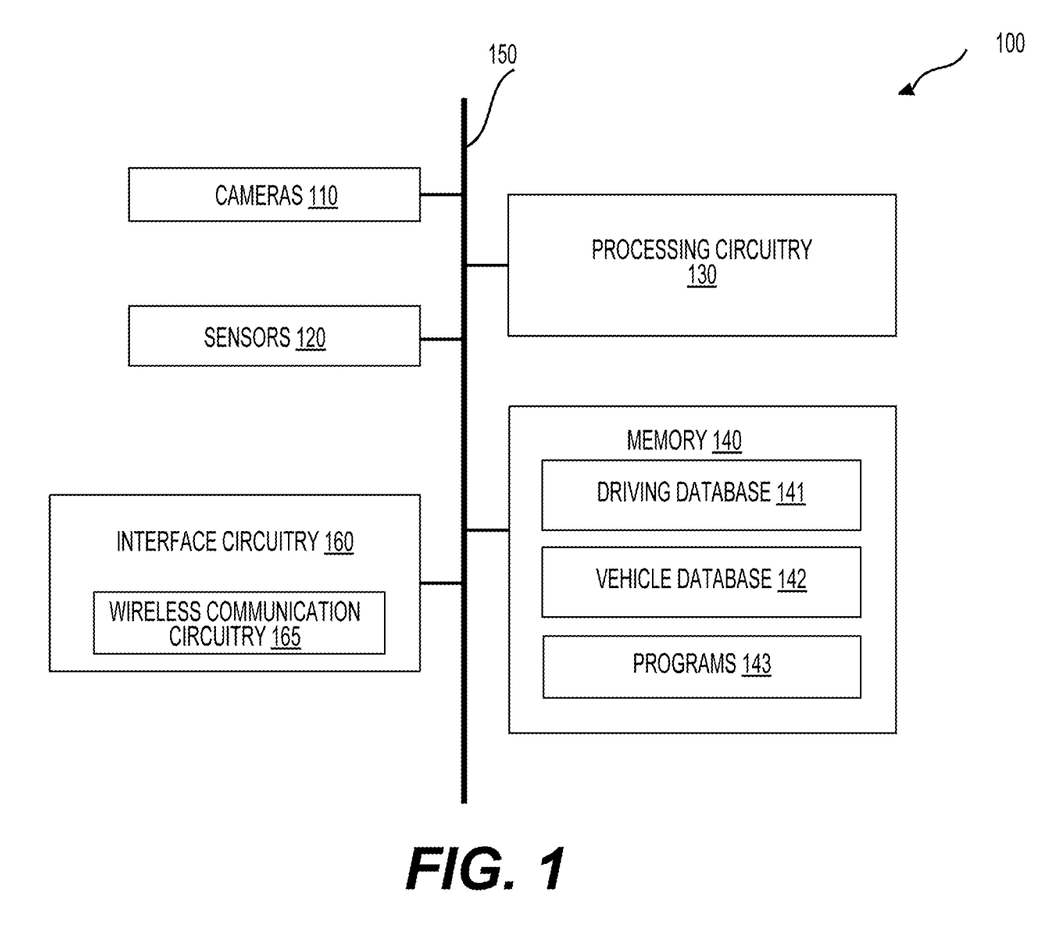
FIG. 1 is a schematic of an exemplary system according to an embodiment of the disclosure.

FIG. 1 is a schematic of an exemplary system 100 according to an embodiment of the disclosure. The system 100 can include camera modules 110, sensors 120, processing circuitry 130, memory 140, and interface circuitry 160 that are coupled together, for example, using a bus 150. In an example, such as shown in FIG. 1, the system 100 is a part of the first vehicle 101. The first vehicle can be any suitable vehicle that can move, such as a car, a cart, a train, or the like. Alternatively, certain components (e.g., the camera modules 110 and the sensors 120) of the system 100 can be located in the first vehicle 101 and certain components (e.g., processing circuitry 130) of the system 100 can be located remotely in a server, a cloud, or the like that can communicate with the first vehicle 101 wirelessly.

Figure 2A:
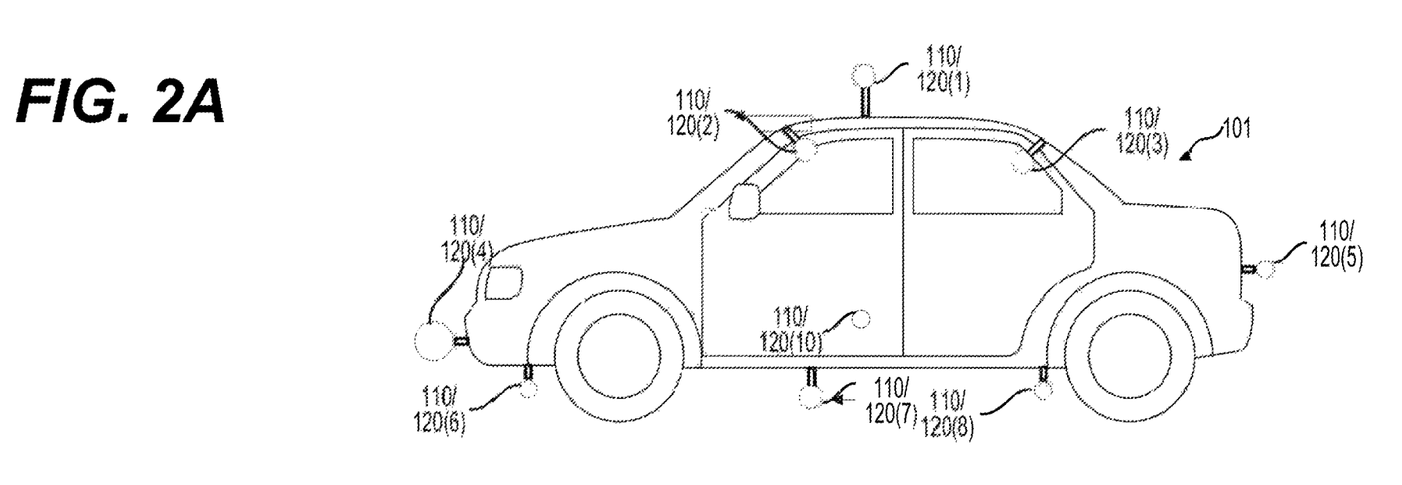
FIGS. 2A-2B show examples of camera modules and sensors in a vehicle according to an embodiment of the disclosure.
Figure 2B:
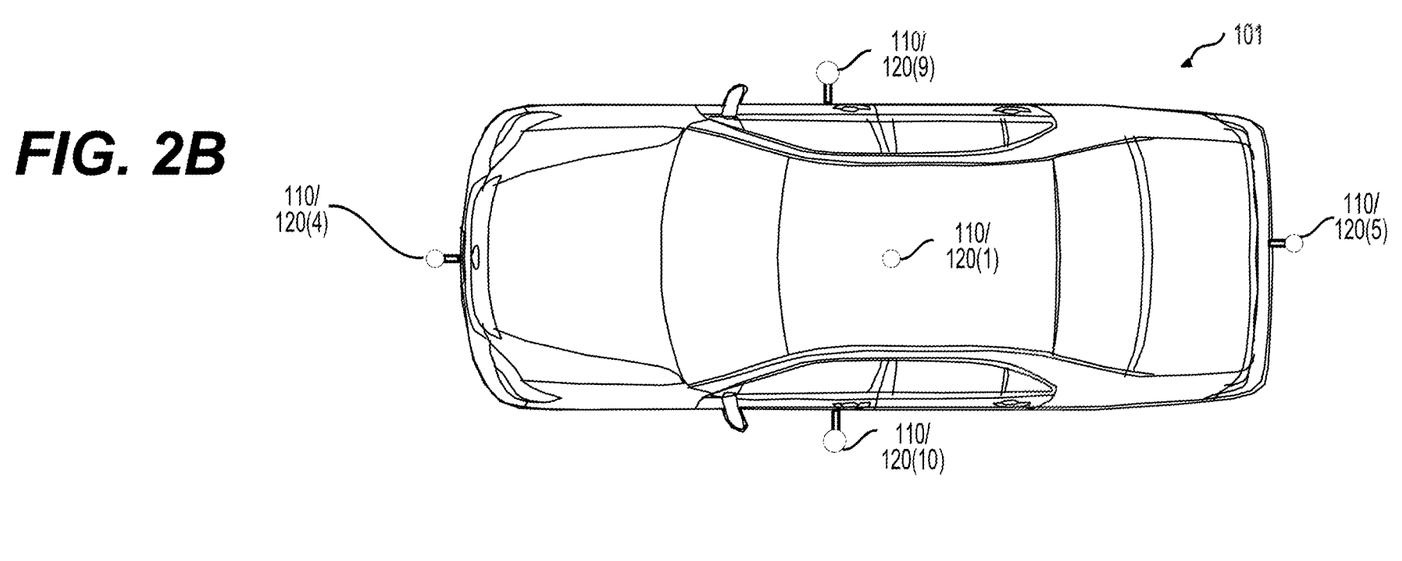

The camera modules 110 can be any suitable devices that can obtain images or videos. The camera modules 110 can capture different views around the first vehicle 101. The camera modules 110 can capture images or videos associated with one or more behaviors of a driver of the vehicle adjacent to the platoon. The camera modules 110 can capture images and videos associated with the one or more behaviors of the vehicle adjacent to the platoon. The camera modules 110 can be fixed to the first vehicle 101. The camera modules 110 can be detachable, for example, the camera modules 110 can be attached to, removed from, and then reattached to the first vehicle 101. The camera modules 110 can be positioned at any suitable locations of any vehicles in the platoon, e.g., the first vehicle 101 in FIG. 2. The camera modules 110 can be oriented toward any suitable directions. Accordingly, the camera modules 110 can obtain images or videos to show different portions of the surrounding environment of the first vehicle 101. The camera modules 110 can also obtain images or videos to show the vehicles adjacent to the first vehicle or adjacent to the platoon. The camera modules 110 can obtain information and data from the images and videos that were taken by the camera modules 110. The information and data may include the one or more behaviors of the vehicles adjacent to the first vehicle or adjacent to the platoon.

In some embodiments, the different portions of the surrounding environment of the first vehicle 101 of the platoon can include a front portion that is in front of the first vehicle 101, a rear portion that is behind the first vehicle 101, a right portion that is to the right of the first vehicle 101, a left portion that is to the left of the first vehicle 101, a bottom portion that shows an under view of the first vehicle 101, a top portion that is above the first vehicle 101, and/or the like. Accordingly, a front view, a rear view, a left view, a right view, a bottom view, and a top view can show the front portion, the rear portion, the left portion, the right portion, the bottom portion, and the top portion of the surrounding environment, respectively. For example, the bottom view can show a tire, a pothole beneath the first vehicle 101, or the like. In another example, the camera modules on a right portion and a left portion can show the behaviors of the vehicles adjacent to the platoon. Different portions, such as the left portion and the bottom portion, can overlap. Additional views (e.g., a right-front view, a top-left view) can be obtained by adjusting an orientation of a camera module, by combining multiple camera views, and thus show corresponding portions of the surrounding environment. An orientation of a camera module can be adjusted such that the camera module can show different portions using different orientations.

Each of the camera modules 110 can be configured to have one or more field of views (FOVs) of the surrounding environment, for example, by adjusting a focal length of the respective camera module 110 or by including multiple cameras having different FOVs in the camera module 110. Accordingly, the first camera views can include multiple FOVs of the surrounding environment. The multiple FOVs can show the behaviors of the vehicles surrounding the first vehicle of the platoon.

In general, the camera modules 110 can include taking different views and/or different FOVs of the surrounding environment. In an example, the images can include the front view, the right-front view, the front bird-eye view (i.e., the front view with the bird-eye FOV), the normal left-front view (i.e., the left-front view with the normal FOV), and/or the like.

The sensors 120 can be a vehicle speed sensor, a wheel speed sensor, a compass heading sensor, an elevation sensor, a LIDAR, a sonar, a GPS location sensor, or the combination thereof. For example, a vehicle speed sensor can provide a speed data of the first vehicle 101. In another example, the vehicle speed sensor in the platoon can provide a speed data of the vehicles adjacent to the platoon. The GPS location sensor can provide one or more GPS coordinates on a map for the first vehicle 101. In an example, the GPS location sensor can provide location data for the vehicles adjacent to the platoon. Therefore, the data collected by sensors 120 can be vehicle speed data, wheel speed data, compass heading data, elevation data, GPS location data, or the combination thereof.

The sensors 120 can further be thermometers, humidity sensors, air quality sensors, or the combination thereof. Therefore, the data collected by the sensors 120 can further include external data such as temperature, humidity, air quality, or the combination thereof. In an example, the sensors 120 can further include the temperature of the vehicles adjacent to the platoon.

In an embodiment, the data collected by the camera modules 110 and sensors 120 may be telemetry data. The telemetry data may include vehicle data and driving data. The vehicle data can be stored in vehicle database 142 in the memory 140 and the driving data can be stored in driving database 141 in the memory 140. The telemetry data collected by the camera modules 110 can be derived from one or more camera modules 110 affixed to the first vehicle 101 in the platoon. The telemetry data collected by the camera modules 110 can also be derived from the one or more camera modules 110 taken by passengers in the first vehicle 101 or passengers in the vehicles in the platoon. The program 143 in the memory 140 may analyze the database from the data collected by camera modules 110 and sensors 120.

FIGS. 2A-2B show examples of the camera modules 110 (e.g., the camera modules 110(1)-(10)) or sensors 120 (e.g., the sensors 120(1)-(10)), according to an embodiment of the disclosure. For example, the camera module 110(1) is positioned on a top side of the first vehicle 101. The camera modules 110(2)-(3) are positioned on a left side of the first vehicle 101 where the camera module 110(2) is near a front end of the first vehicle 101 and the camera module 110(3) is near a rear end of the first vehicle 101. The camera module 110(4) is positioned on the front end of the first vehicle 101 where the camera module 110(5) is positioned at the rear end of the first vehicle 101. The camera modules 110(6)-(8) are positioned on a bottom side of the first vehicle 101. The camera modules 110(9)-(10) are positioned on the left side and a right side of the first vehicle 101, respectively.

In an example, the sensor 120(1) is positioned on a top side of the first vehicle 101 of the platoon. The sensors 120(2)-(3) are positioned on a left side of the first vehicle 101 where the sensor 120(2) is near a front end of the first vehicle 101 and the sensor 120(3) is near a rear end of the first vehicle 101. The sensor 120(4) is positioned on the front end of the first vehicle 101 where the sensor 120(5) is positioned at the rear end of the first vehicle 101. The sensors 120(6)-(8) are positioned on a bottom side of the first vehicle 101. The sensors 120(9)-(10) are positioned on the left side and a right side of the first vehicle 101, respectively.

In an example, the camera modules 110 and the sensors 120 can be positioned together. The camera module 110(1) and the sensor 120(1) are positioned on a top side of the first vehicle 101 of the platoon. The camera modules 110(2)-(3) and the sensors 120(2)-(3) are positioned on a left side of the first vehicle 101 where the camera module 110(2) and the sensor 120(2) are near a front end of the first vehicle 101 and the camera module 110(3) and the sensor 110(3) are near a rear end of the first vehicle 101. The camera modules 110(4) and the sensor 110(4) are positioned on the front end of the first vehicle 101 where the camera modules 120(5) and the sensor 110(5) are positioned at the rear end of the first vehicle 101. The camera modules 110(6)-(8) and the sensors 110(6)-(8) are positioned on a bottom side of the first vehicle 101. The camera modules 110(9)-(10) and the sensors 110

(9)-(10) are positioned on the left side and a right side of the first vehicle 101, respectively.

In an example, the camera module 110(4) is oriented such that the camera module 110(4) can obtain images or videos of the front portion of the surrounding environment. For example, the front potion of the surrounding environment may include the vehicles adjacent to the platoon. In addition, the sensor 120(4) may or may not be oriented such that the sensor 120(4) can detect more information such as current weather condition, temperature, sound from other vehicles adjacent to the platoon, or a combination thereof.

The descriptions related to the camera module 110(4) and sensor 120(4) can be suitably adapted to other camera modules or sensors. For example, the camera module 110 (10) is oriented such that the camera module 110(10) can obtain images or videos of the left portion of the surrounding environment or the vehicles adjacent to the platoon. In addition, the sensors 120(10) may or may not be oriented such that the sensor 120(4) can detect more information such as current weather condition, temperature, sound from other vehicles adjacent to the platoon, or a combination thereof. Therefore, the one or more behaviors of the vehicles may be captured by the captured images or videos.

In some embodiments, the surrounding environment of the first vehicle 101 can include road conditions, lane markers, road signs, traffic signs, objects including, for example, vehicles, pedestrians, obstacles, on or close to the roads, and the like. The surrounding environment of the first vehicle 101 of the platoon may include the one or more behaviors of the vehicles adjacent to the platoon. The one or more behaviors may include changes in vehicle speed, changes in lane position, driver head orientation, driver head movement, and location of hands of the drivers on a steering wheel of the one or more vehicles adjacent to the platoon. The camera modules 110 can capture traffic sign(s) and/or road signs (e.g., for re-routing during an event, such as a marathon), potential hazardous objects such as a pothole, accident debris, a roadkill, and/or the like.

In an embodiment, an event occurs near the first vehicle 101 of the platoon or the vehicles adjacent to the platoon, the camera modules 110 can be used to show certain portion(s) of the surrounding environment of the first vehicle 101 such as the vehicles adjacent to the platoon. For example, the event is a marathon and roads are rerouted, and thus a camera view is used to capture more traffic signs for rerouting to help the user of the first vehicle 101 in a platoon. In another example, the processing circuitry can include the event data to accurately determine what the one or more behaviors of the drivers of the vehicles adjacent to the platoon are. For example, if the processing circuitry knows that there is a marathon event happening nearby the vehicles adjacent to the platoon, then the drivers of the vehicles may have a higher chance to drive further away from the event. Therefore, a driving direction of the vehicles may be predicted. The events can include a recurring event such as a school drop-off and/or pick-up in a school zone, a bus drop-off and/or pick-up at a bus stop along a bus route, a railroad crossing.

The sensors 120 can include any suitable devices that can detect user characteristic(s) (e.g., a face, weight information, a finger print, a voice, a seat selection, a personal portal device) of the user of the first vehicle 101 in the platoon or the drivers of the vehicles adjacent to the platoon. In an embodiment, the system 100 can also include camera module(s) or sensors (e.g., an internal camera inside the first vehicle 101) configured to obtain images of the face of the user or driver, for example, for face recognition, weight sensors configured to determine the weight information of the user or the driver, finger print sensors configured to obtain one or more finger prints of the user or the driver, a voice detection sensor, for example, including a microphone that is configured to detect the voice of the user, and/or the like. In addition, the system may include devices such as a communication device, e.g., a Bluetooth device such that the user can be determined by pairing the smartphone of the user with the Bluetooth device. The sensors 120, e.g., a key recognition sensor, can also detect a key associated with the user or the driver. The sensors 120 can be detachable from the first vehicle 101. The sensors 120 can be attached to the first vehicle 101. The sensors 120 can be detachable from the vehicles adjacent to the platoon. The sensors 120 can be attached to the vehicles adjacent to the platoon.

The interface circuitry 160 can be configured to communicate with any suitable device or the user of the first vehicle 101 using any suitable devices and/or communication technologies, such as wired, wireless, fiber optic communication technologies, and any suitable combination thereof. The interface circuitry 160 can include wireless communication circuitry 165 that is configured to receive and transmit data wirelessly from servers (e.g., a dedicated server, a cloud including multiple servers), vehicles (e.g., using vehicle-to-vehicle (V2V) communication), infrastructures (e.g., using vehicle-to-infrastructure (V2I) communication), one or more third-parties (e.g., a municipality), map data services (e.g., Google Maps, Waze, Apple Maps), and/or the like. In an example, the wireless communication circuitry 165 can communicate with mobile devices including a mobile phone via any suitable wireless technologies such as IEEE 802.15.1 or Bluetooth. In an example, the wireless communication circuitry 165 can use wireless technologies, such as IEEE 802.15.1 or Bluetooth, IEEE 802.11 or Wi-Fi, mobile network technologies including such as global system for mobile communication (GSM), universal mobile telecommunications system (UMTS), long-term evolution (LTE), fifth generation mobile network technology (5G) including ultra-reliable and low latency communication (URLLC), and the like.

The interface circuitry 160 can include any suitable individual device or any suitable integration of multiple devices such as touch screens, keyboards, keypads, a mouse, joysticks, microphones, universal series bus (USB) interfaces, optical disk drives, display devices, audio devices (e.g., speakers), and the like. The interface circuitry may include a display device. The display device can be configured to display images/videos captured by one of the camera modules 110.

The interface circuitry 160 can also include a controller that converts data into electrical signals and sends the electrical signals to the processing circuitry 130. The interface circuitry 160 can also include a controller that converts electrical signals from the processing circuitry 130 to the data, such as visual signals including text messages used by a display device, audio signals used by a speaker, and the like. For example, the interface circuitry 160 can be configured to output an image on an interactive screen and to receive data generated by a stylus interacting with the interactive screen.

The interface circuitry 160 can be configured to output data, such as vehicle data and driving data from the camera modules 110 and the sensors 120 determined by the processing circuitry 130, to the user of the first vehicle 101, and the like.

The interface circuitry 160 can be configured to receive data, such as the vehicle data and the driving data described above. The vehicle data can include or indicate driving scenarios and/or vehicle characteristics for the vehicle by the respective camera modules 110 or sensors 120 such as times, locations, vehicle types, events, and/or like. The driving data can include or indicate which lane that the vehicle is currently driving, head of the vehicle, movement of the head of the driver, location of the hands of the drivers on a steering wheel of the one or more vehicles adjacent to the platoon. In an example, a driver has been driving with one hand at five o'clock. If the driver suddenly puts hands at ten o'clock and two o'clock, this could indicate that the driver has an intention to move into or cut through a platoon.

In an embodiment, the vehicles adjacent to the platoon are different from the first vehicle 101, and the vehicle data from camera modules or sensors in the vehicles adjacent to the platoon are second vehicle data. In an example, the second vehicle data may include first vehicle data from the first vehicle 101 in the platoon. In an example, the user in the second vehicle uses the first vehicle data to determine whether the platoon decides to increase or decrease the yielding space of the platoon. In some embodiments, the system in the first vehicle uses the second vehicle data to determine the behaviors of the vehicles adjacent to the platoon to increase or decrease the yielding space of the platoon.

The first vehicle data can indicate or include road information of certain events (e.g., an accident, a criminal event, a school event, a construction, a celebration, a sport event) for the first vehicle 101. For example, the events can occur in or in close proximity (e.g., a distance between the first vehicle 101 and the event is within a certain distance threshold) of the first vehicle 101. The user of the first vehicle 101 can also indicate or include the second vehicle data associated with the vehicles adjacent to the platoon to extract or use the road information of certain events (e.g., an accident, a criminal event, a school event, a construction, a celebration, a sport event) of the vehicles adjacent to the platoon to understand one or more the events occurring in or in close proximity of the first vehicle 101 or the platoon.

The interface circuitry 160 can be configured to receive routing data for routing the first vehicle 101. In an example, the interface circuitry 160 can receive positioning information from various satellite-based positioning systems such as a global positioning system (GPS), and determine a position of the first vehicle 101. In some examples, the position can be a physical address, the latitude and longitude coordinates of a geographic coordinate system used by satellite-based positioning systems such as a GPS, and the like.

The interface circuitry 160 can receive user identification information, for example, interactively. In an example, the interface circuitry 160 can output inquiries, such as questions and the like related to a user identity. The interface circuitry 160 can be configured to receive data related to the inquiries.

The interface circuitry 160 can receive a user preference of the user of the first vehicle 101. The user preference can indicate a vehicle data history of the user. For example, the vehicle data history may indicate a user preference for the front view for the camera modules instead of the normal view for the camera modules. The vehicle data history may also indicate a user preference of a direction of driving a vehicle towards or away from a platoon.

In some embodiments, the vehicle data history of the vehicles adjacent to the platoon may indicate that the vehicles adjacent to the platoon enter the platoon or cross the platoon in certain time of a day. Furthermore, the processing circuitry may determine a likelihood of the vehicles planning to enter the platoon in certain time of a day based on the vehicle data history. For example, if the vehicle data history shows that vehicles more frequently enter the platoon at 12 am, the platoon may be more sensitive to allowing them to cut in at that time.

The interface circuitry 160 can output the vehicle data determined by the processing circuitry 130 to the user of the first vehicle 101. The interface circuitry 160 can receive an input from the user indicating a user selection. The user can select one or more of the vehicle data (e.g., camera views) via the interface circuitry 160. Alternatively, the user can select none of the vehicle data and indicate vehicle data (e.g., camera views) selected by the user of the first vehicle 101 via the interface circuitry 160.

The processing circuitry 130 can be configured to determine one or more triggering events from the vehicle data from the vehicle database 142 and the driving data from the driving database 141. The one or more triggering events may include the one or more vehicles entering into the platoon and the one or more vehicles crossing the platoon. For example, the processing circuitry 130 can locate driving data at the current location of the vehicle adjacent to the platoon using the global positional system (GPS) data of the vehicle. After locating the map data, the processing circuitry 130 can determine whether the vehicle has an intention to enter into or cross the platoon based on its proximity to the platoon.

The processing circuitry 130 can obtain the vehicle data directly or can extract the vehicle data from images, videos, or the like. In an example, the processing circuitry 130 receives images from the first vehicle in the platoon. The images can show a portion of a surrounding environment of the first vehicle. The processing circuitry 130 can extract vehicle information based on the images. For example, the processing circuitry 130 can extract the vehicle information such as vehicle type, vehicle color, and vehicle manufacturer of the vehicles adjacent to the platoon based on the received images.

The interface circuitry 160 can receive vehicle data, for example, from the second vehicles, from a server configured to collect the data from the second vehicles, from a cloud, and/or the like. In an example, the received data include the several second camera images such as a front view image and a rear view image, and the processing circuitry 130 obtains the second camera images from the interface circuitry 160. In an example, the received data include images/videos. The processing circuitry 130 obtains the images/videos, and subsequently determines or extracts the second camera views based on the images/videos.

In an example shown in FIG. 1, the processing circuitry 130 is part of the first vehicle 101. In an example, the processing circuitry 130 can be implemented in a server, a cloud, or the like, that is remote from the first vehicle 101. The server, the cloud, or the like can communicate wirelessly with the first vehicle 101 regarding the reconstruction, the vehicle data, and the map data, or the like.

The memory 140 is configured to store map data in the map database 141 including road maps. The memory 140 is also configured to store vehicle data in the vehicle database 142, such as a user list including the user information of the multiple users, and programs 143. In an embodiment, information (e.g., data in the driving database 141, the vehicle database 142) in the memory 140 can be modified or updated by the processing circuitry 130. The modified information can also be uploaded to a cloud services platform that can provide on-demand delivery of computing power, database storage, and IT resources or shared with other vehicles, for example, using the wireless communication circuitry 165 via V2I and V2V communications, respectively.

The memory 140 can be a non-volatile storage medium. In another embodiment, the memory 140 includes both non-volatile and volatile storage media. In one embodiment, a portion of the memory 140 can be integrated into the processing circuitry 130. The memory 140 can be located remotely and communicate with the processing circuitry 130 via a wireless communication standard using the wireless communication circuitry 165.

In an embodiment, in the FIG. 1, for example, the components are coupled together by a bus architecture including a bus 150. Other suitable interconnection techniques can also be used.

One or more components of the interface circuitry 160, the processing circuitry 130, and the memory 140 can be made by discrete devices or integrated devices. The circuits for one or more of the interface circuitry 160, the processing circuitry 130, and the memory 140 can be made by discrete circuits, one or more integrated circuits, application-specific integrated circuits (ASICs), and the like. The processing circuitry 130 can also include one or more central processing units (CPUs), one or more graphic processing units (GPUs), dedicated hardware or processors to implement neural networks, and the like.

Figure 3:
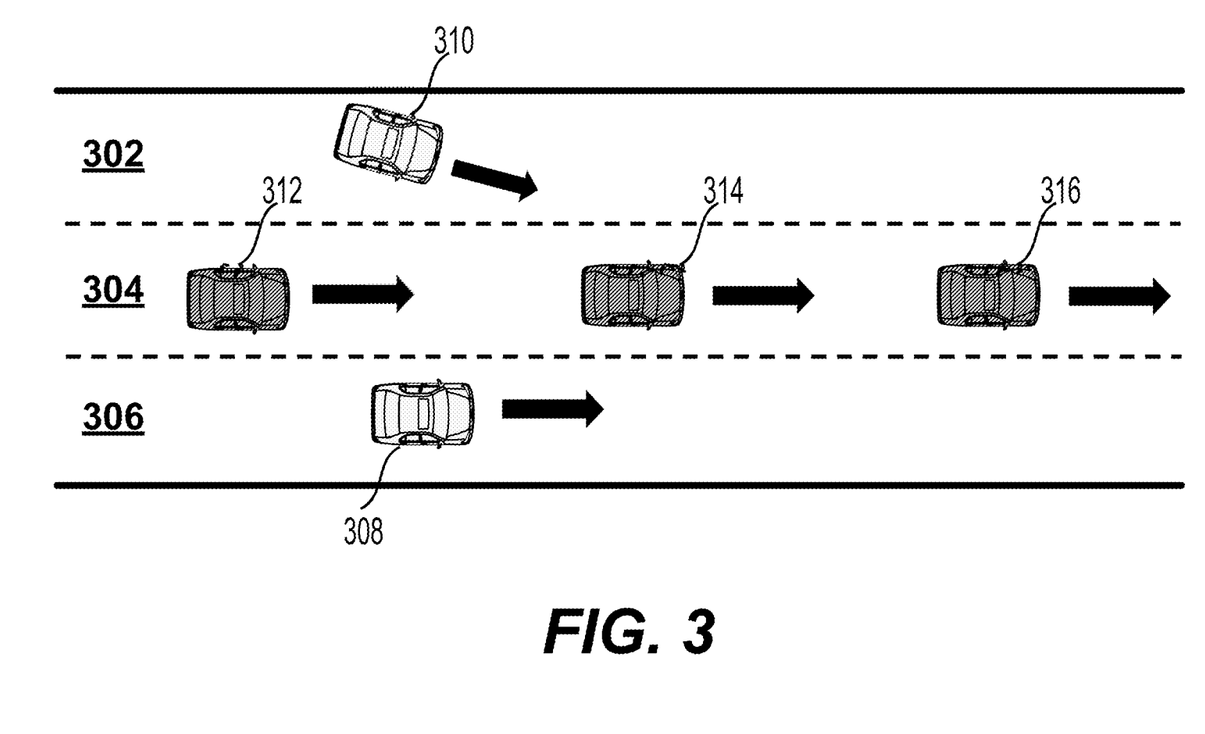
FIG. 3 is a diagram showing one or more vehicles adjacent to a platoon according to an embodiment of the disclosure.

FIG. 3 is a diagram showing one or more vehicles adjacent to a platoon according to an embodiment of the disclosure.

In an embodiment, the camera modules and the sensors in the vehicles 312, 314, and 316 in a platoon may capture images or videos of the vehicle 310 in the lane 302. The processing circuitry analyzes the images or videos of the vehicle 310 to determine if there is triggering event for this vehicle. The triggering event may be that the vehicle 310 plans to cross the platoon or enter into the platoon. After the triggering event is detected, the processing circuitry may increase or decrease a yielding space of the platoon based on the detected triggering event.

In an embodiment, the camera modules and the sensors in the vehicles 312, 314, and 316 may capture images or videos of the vehicle 308 in the lane 306. The processing circuitry analyzes the images or videos of the vehicle 308 to determine if there is triggering event for this vehicle. The triggering event may be the vehicle 308 plans to cross the platoon or enter into the platoon. If the processing circuitry determines that there is no triggering event happening for the vehicle 308 and the processing circuitry determines that the vehicle 308 may plan to stay on the lane 306, the processing circuitry may not increase or decrease a yielding space of the platoon.

In some embodiments, the vehicles 308 and 310 may be manually-driven vehicles (MDVs). The MDVs adjacent to the platoon may move towards the platoon slowly. If the platoon detects this behavior, the platoon will begin to slowly open a yielding space.

In some embodiments, there is a time limit for the platoon to open the yielding space. For example, if the MDVs do not show any cut-in behavior for 30 seconds after the yielding space is open, the platoon will begin to slowly close the yielding space.

In some embodiments, the platoon may receive data associated with the road conditions. For example, if a pothole exists in the road ahead in the lanes of MDVs, the platoon may receive data mentioning the pothole existing in the road ahead in the lanes of MDVs. Therefore, it is possible that the MDVs may move towards the platoon slowly to avoid the pothole. In addition, the platoon may preemptively open up a yielding space for the MDVs before any vehicle in the MDVs starts to move towards the platoon. In another example, if the MDVs laterally move towards the platoon, the platoon will also begin to slowly open up a yielding space for the MDVs.

In some embodiments, the driver's head position and driver's hands can also be used to determine for the platoon to open a yielding space. For example, if the driver's head position turns towards the platoon, the platoon will rapidly open a larger yielding space. In another example, if the driver's hands on wheel change position, e.g., 2 o'clock position, to accommodate the lane change, the platoon will also rapidly open a larger yielding space.

Figure 4:
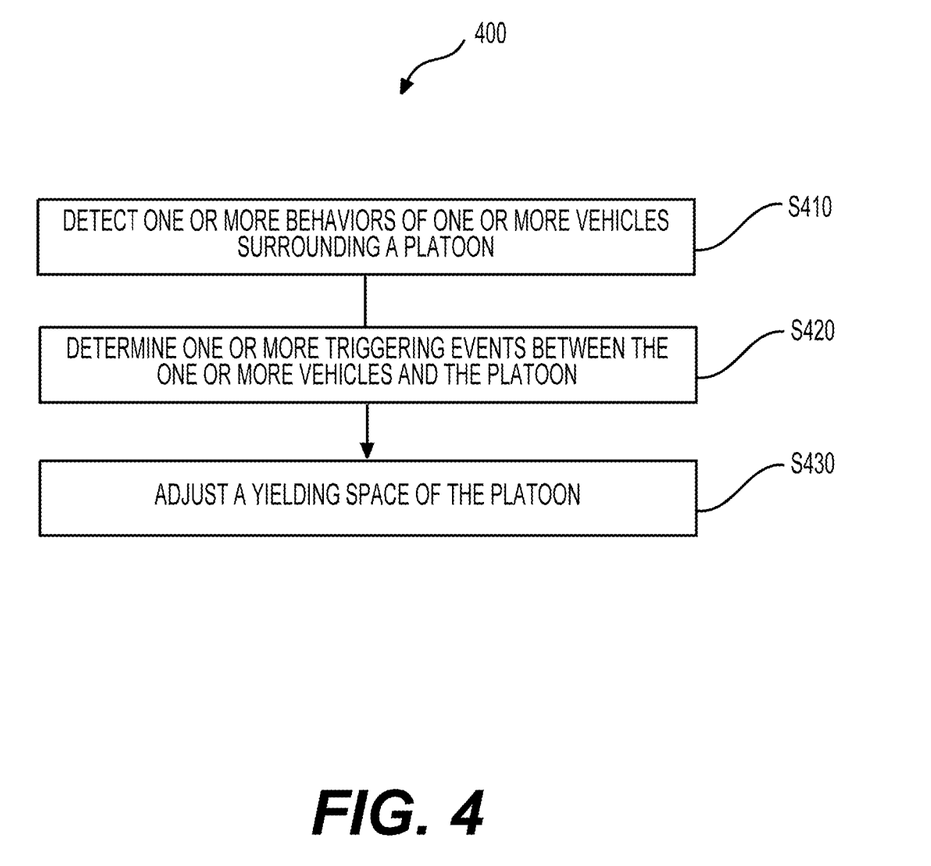
FIG. 4 is a flowchart outlining an exemplary process 400 according to an embodiment of the disclosure.

FIG. 4 is a flowchart outlining an exemplary process 400 according to an embodiment of the disclosure. In an example, the process 400 can be implemented using the system 100 described in FIG. 1. In an embodiment, the process 400 can be used to adjust a yielding space of a platoon. For purposes of brevity, descriptions are given for the first vehicle 101 in the platoon, and the descriptions can be suitably adapted to any suitable vehicle. As described above, the first vehicle 101 in the platoon can include the camera modules 110 and the sensors 120 configured to have first vehicle data. The first vehicle data can include data from the camera modules 110 and data from the sensors 120. The process 400 starts at S410 and proceeds to S430.

At S410, one or more behaviors of one or more vehicles adjacent to a platoon can be detected, for example, via the camera modules 110 and the sensors 120 in FIG. 1, as described above with reference to the first embodiment. The data related to the one or more behaviors can be from either camera modules 110 or the sensors 120, or a combination thereof.

As described above in FIG. 3, the one or more behaviors can be from the vehicle 308 or the vehicle 310 adjacent to the platoon. Camera modules and sensors in the vehicles 308 and 310 may also detect one or more behaviors of the vehicles in the platoon in the step S410.

In an embodiment, images or videos from the camera modules and sensors are received by the interface circuitry 160, and the multiple second camera views are determined by the processing circuitry 130 from the received images/videos. In some embodiments, the camera modules 110 and the sensors 120 may detect the surrounding environment of the vehicle including traffic, road condition, or the like, which may be further used in the step S420.

At S420, one or more triggering events between the one or more vehicles and the platoon are determined. For example, the triggering events may be that the vehicle adjacent to the platoon plans to enter into the platoon. The triggering event may be that the vehicle adjacent to the platoon plans to cross the platoon. The determination of the triggering events may be based on the detected one or more behaviors of the one or more vehicles adjacent to the platoon. The determination of the triggering events may also be based on the surrounding environment of the vehicle.

In some embodiments, the one or more triggering events may include explicit triggering events and implicit triggering events. The explicit triggering events may be triggered by explicit behaviors. The implicit triggering events may be triggered by implicit behaviors. For example, a turning signal of a vehicle may be an explicit behavior. If a vehicle adjacent to a platoon has a turning signal indicating that the vehicle plans to enter the platoon, the vehicle planning to enter the platoon may be the explicit triggering event.

In another example, a head position of the driver of the vehicle adjacent to the platoon may be an implicit behavior.

If the driver turns the head position to the direction of the platoon, the driver may plan to enter the platoon. The driver planning to enter the platoon triggered by the implicit behavior may be an implicit triggering event.

At S430, the processing circuitry 130 can adjust a yielding space of the platoon based on the triggering events. As described above, the processing circuitry may increase or decrease the yielding space based on the determination of the triggering events. For example, as described above, the processing circuitry 130 may increase the yielding space of the platoon when a triggering event is detected such as the vehicles adjacent to the platoon planning to enter into the platoon. In another example, the processing circuitry 130 may not increase the yielding space of the platoon when the processing circuitry determines that the vehicles adjacent to the platoon plan to stay in their respective lane.

Different vehicles can have different vehicle data and different driving data available in the respective vehicles. The process 400 can be adapted by different vehicle type and different vehicle condition. For example, a second vehicle adjacent to the platoon may be larger than the size of the first vehicle adjacent to the platoon. In some embodiments, the processing circuitry may adjust the yielding space of the platoon to accurately reflect the yielding space for the second vehicle. In addition, the process 400 can be applicable to vehicles from different manufactures.

Figure 5:
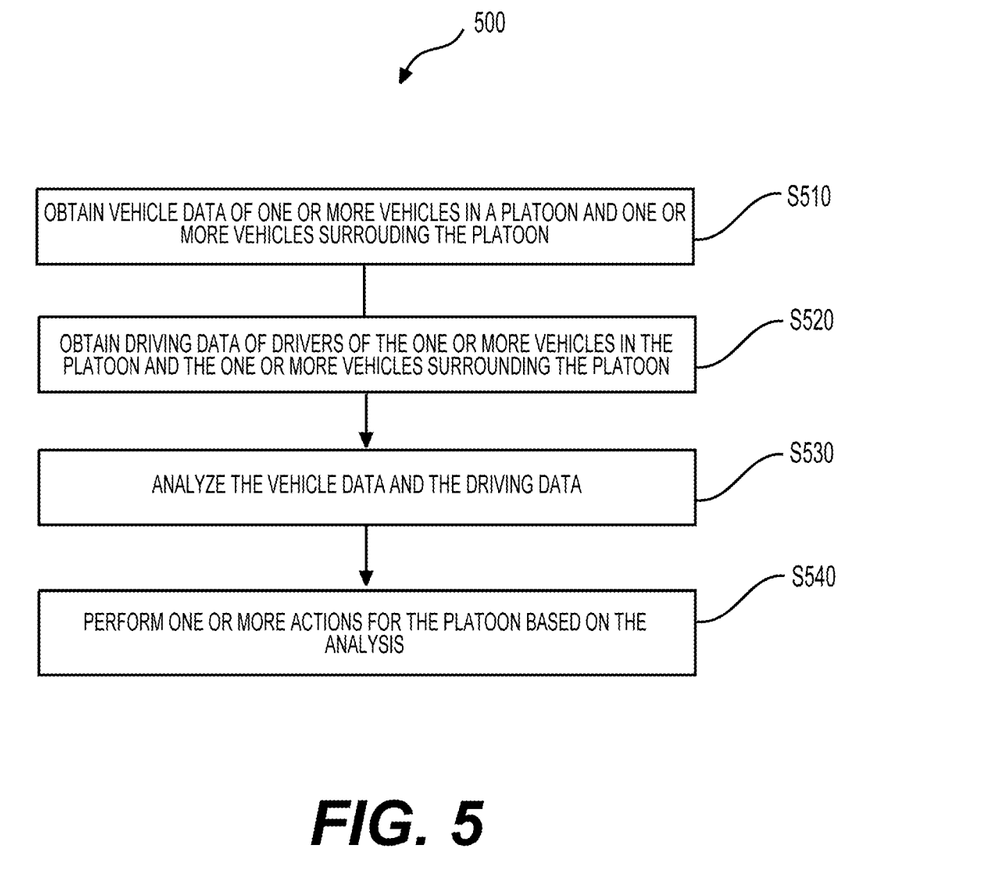
FIG. 5 is a flowchart outlining an exemplary process 500 according to an embodiment of the disclosure.

FIG. 5 is a flowchart outlining an exemplary process 500 according to an embodiment of the disclosure. In an example, the process 500 can be implemented using the system 100 shown in FIG. 1. In an embodiment, the process 500 can be used to perform one or more actions for the platoon. As described above, the first vehicle 101 in a platoon can include that the camera modules 110 and sensors 120 are configured to collect telemetry data such as vehicle data and driving data. The process 500 starts at S510 and proceeds to S540.

At S510, vehicle data of one or more vehicles in a platoon and vehicle data of one or more vehicles adjacent to the platoon are obtained. For example, the vehicle data of one or more vehicles in a platoon may include vehicle size, vehicle manufacturer, or the vehicle model for the vehicles in the platoon. The vehicle data of the one or more vehicles adjacent to the platoon may include vehicle size, vehicle manufacturer, or the vehicle model for the vehicles adjacent to the platoon.

In an example, the vehicle data may include data such as a user list having multiple users (e.g., a first user and a second user) and user information of the multiple users. The vehicle data can be collected by camera modules 110 and sensors 120, and stored in the memory 140, a cloud, a server, and/or the like. The multiple users can include users of the first vehicle 101 and/or users of other vehicles. The cloud and/or the server can be specific to a manufacturer, can be shared among multiple manufacturers, or can be a public cloud/server.

At S520, driving data of one or more vehicles in a platoon and driving data of one or more vehicles adjacent to the platoon are obtained. For example, the driving data of one or more vehicles in a platoon may include driving history of the vehicles in the platoon. The driving data of the one or more vehicles adjacent to the platoon may include age of the driver, gender of the driver, and driving history of the driver of the vehicles adjacent to the platoon. In another example, the driving data may include data that indicates that the vehicle in the platoon may plan to stay in the platoon only for a certain period of time, e.g. 2 hours, so the system may adjust the yielding space of the platoon based on the planned schedule of each vehicle in the platoon.

In an example, the driving data may include data such as the driving records of the drivers of the one or more vehicles adjacent to the platoon. The driving data can be collected by camera modules 110 and sensors 120, and stored in the memory 140, a cloud, a server, and/or the like. The cloud and/or the server can be specific to a manufacturer, can be shared among multiple manufacturers, or can be a public cloud/server.

In some embodiments, the vehicle data and driving data may be shared to a cloud, and other users in an area nearby the vehicles in the platoon or the vehicles adjacent to the platoon may be viewed. The vehicle data and the driving data may be limited to a certain group of users (e.g., friends), or a certain number of users. For example, the vehicle data and the driving data may be limited to be accessed by 20 users maximum. In addition, the vehicle data and the driving data may be limited to only be shared to coworkers in a same company if the vehicles in the platoon are from a same company.

In some embodiments, the driving data and the vehicle data may be expanded to share to users in a defined location which is different than the current location where the platoon is. For example, the driver in the first vehicle 101 adjacent to a platoon is currently in a city. The driver may define the driving data and the vehicle data of the first vehicle to be shared to family members in a platoon in another city to see the driver's current status.

At S530, the processing circuitry analyzes the vehicle data and the driving data. As described above, the processing circuitry can extract the information from the vehicle data and the driving data, and then the processing circuitry can analyze the information. For example, the information may include a direction of the vehicle adjacent to the platoon that the vehicle is driving. The information may include a direction of the head of the driver in the vehicle. The information may include a location of the hands of the driver of the vehicle on the wheels.

At S540, the processing circuitry may perform one or more actions for the platoon based on the analysis in the step S530. The one or more actions may include increasing a yielding space of the platoon, adjusting a driving direction of the platoon, or changing the lane of the platoon. For example, if the analysis in the step S530 is that the vehicles adjacent to the platoon plan to enter into the platoon or cross the platoon, then the processing circuitry may determine that the platoon increases the yielding space for the vehicles to enter into the platoon or cross the platoon. In another example, if the analysis in the step S530 is that the vehicles adjacent to the platoon plan to use the lane that the platoon is currently driving in, e.g., a police vehicle, and then the platoon may change the lane of the platoon to yield for the police vehicle.

The process 500 can be suitably modified. Step(s) can be added, omitted, and/or combined. An order of implementing steps in the process 500 can be adapted. In an example, the order of the steps S510 and S520 may be switched.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method of adjusting a yielding space of a platoon, comprising:
    detecting, by a first set of sensors, a plurality of behaviors of one or more vehicles adjacent to the platoon, wherein the plurality behaviors of the one or more vehicles adjacent to the platoon include changes in vehicle speed, changes in lane position, driver head orientation, driver head movement, and location of hands of the drivers on a steering wheel of the one or more vehicles adjacent to the platoon;
    obtaining driving data of vehicles of the platoon and the one or more vehicles adjacent to the platoon, wherein the driving data includes brake usage, vehicle speed, turning signal usage, steering entropy, steering wheel reversal frequency, steering wheel reversal rate, average vehicle position within lane, driver age and gender, a planned staying time in the platoon, vehicle type, and vehicle condition;
    determining, using processing circuitry, one or more triggering events between the one or more vehicles adjacent to the platoon and the platoon by analyzing the plurality of behaviors and the driving data; and
    adjusting the yielding space of the platoon based on the one or more triggering events and the driving data when the one or more vehicles adjacent to the platoon executes the one or more triggering events within a predetermined time.

2. The method of claim 1, wherein the first set of sensors includes one or more camera modules, Lidar, radars, or ultrasonic sensors.

3. The method of claim 1, wherein the first set of sensors is in the platoon.

4. The method of claim 1, wherein the one or more triggering events include the one or more vehicles adjacent to the platoon entering into the platoon and the one or more vehicles adjacent to the platoon crossing the platoon.

5. The method of claim 1, wherein the yielding space is adjusted based on the one or more triggering events, the adjustment including a speed of adjusting the yielding space or a length of the yielding space.

6. The method of claim 1, further comprising:
    detecting, by a second set of sensors, the plurality of behaviors of the one or more vehicles adjacent to the platoon;
    determining, using the processing circuitry, the one or more triggering events between the one or more vehicles adjacent to the platoon and the platoon based on the plurality of behaviors; and
    adjusting the yielding space of the platoon.

7. The method of claim 6, wherein the second set of sensors is in the one or more vehicles adjacent to the platoon.

8. A system for adjusting a yielding space of a platoon, comprising:
    a database server including processing circuitry configured to:
    detect, by a first set of sensors, a plurality of behaviors of one or more vehicles adjacent to the platoon, wherein the plurality of behaviors of the one or more vehicles adjacent to the platoon include changes in vehicle speed, changes in lane position, driver head orientation, driver head movement, and location of hands of the drivers on a steering wheel of the one or more vehicles adjacent to the platoon;
    obtain driving data of vehicles of the platoon and the one or more vehicles adjacent to the platoon, wherein the driving data includes brake usage, vehicle speed, turning signal usage, steering entropy, steering wheel reversal frequency, steering wheel reversal rate, average vehicle position within lane, driver age and gender, a planned staying time in the platoon, vehicle type, and vehicle condition;
    determine one or more triggering events between the one or more vehicles adjacent to the platoon and the platoon by analyzing the plurality of behaviors and the driving data; and
    adjust the yielding space of the platoon based on the one or more triggering events and the driving data when the one or more vehicles adjacent to the platoon executes the one or more triggering events within a predetermined time.

9. The system of claim 8, wherein the first set of sensors include one or more camera modules, Lidar, radars, or ultrasonic sensors.

10. The system of claim 8, wherein the first set of sensors is in the platoon.

11. The system of claim 8, wherein the one or more triggering events include the one or more vehicles adjacent to the platoon entering into the platoon and the one or more vehicles adjacent to the platoon crossing the platoon.

12. The system of claim 8, wherein the processing circuitry is further configured to:
    detect, by a second set of sensors, the plurality of behaviors of the one or more vehicles adjacent to the platoon;
    determine, using the processing circuitry, the one or more triggering events between the one or more vehicles adjacent to the platoon and the platoon based on the plurality of behaviors; and
    adjust the yielding space of the platoon.

13. The system of claim 12, wherein the second set of sensors is in the one or more vehicles adjacent to the platoon.

14. A non-transitory computer readable storage medium having instructions stored thereon that when executed by processing circuitry causes the processing circuitry to perform a method, the method comprising:
    detecting, by a set of sensors, a plurality of behaviors of one or more vehicles adjacent to the platoon, wherein the plurality of behaviors of the one or more vehicles adjacent to the platoon include changes in vehicle speed, changes in lane position, driver head orientation, driver head movement, and location of hands of the drivers on a steering wheel of the one or more vehicles adjacent to the platoon;
    obtaining driving data of vehicles of the platoon and the one or more vehicles adjacent to the platoon, wherein the driving data includes brake usage, vehicle speed, turning signal usage, steering entropy, steering wheel reversal frequency, steering wheel reversal rate, average vehicle position within lane, driver age and gender, a planned staying time in the platoon, vehicle type, and vehicle condition;
    determining one or more triggering events between the one or more vehicles adjacent to the platoon and the platoon by analyzing the plurality of behaviors and the driving data; and
    adjusting the yielding space of the platoon based on the one or more triggering events and the driving data when the one or more vehicles adjacent to the platoon executes the one or more triggering events within a predetermined time.

15. The method of claim 1, wherein the adjusting the yielding space of the platoon is increasing the yielding space of the platoon.

16. The method of claim 1, wherein the one or more triggering event is determined when the head of the driver of the one or more vehicles adjacent to the platoon turns to a direction of the platoon and the hands of the driver change position on the steering wheel of the one or more vehicles adjacent to the platoon.

\* \* \* \* \*